No. 787,514.

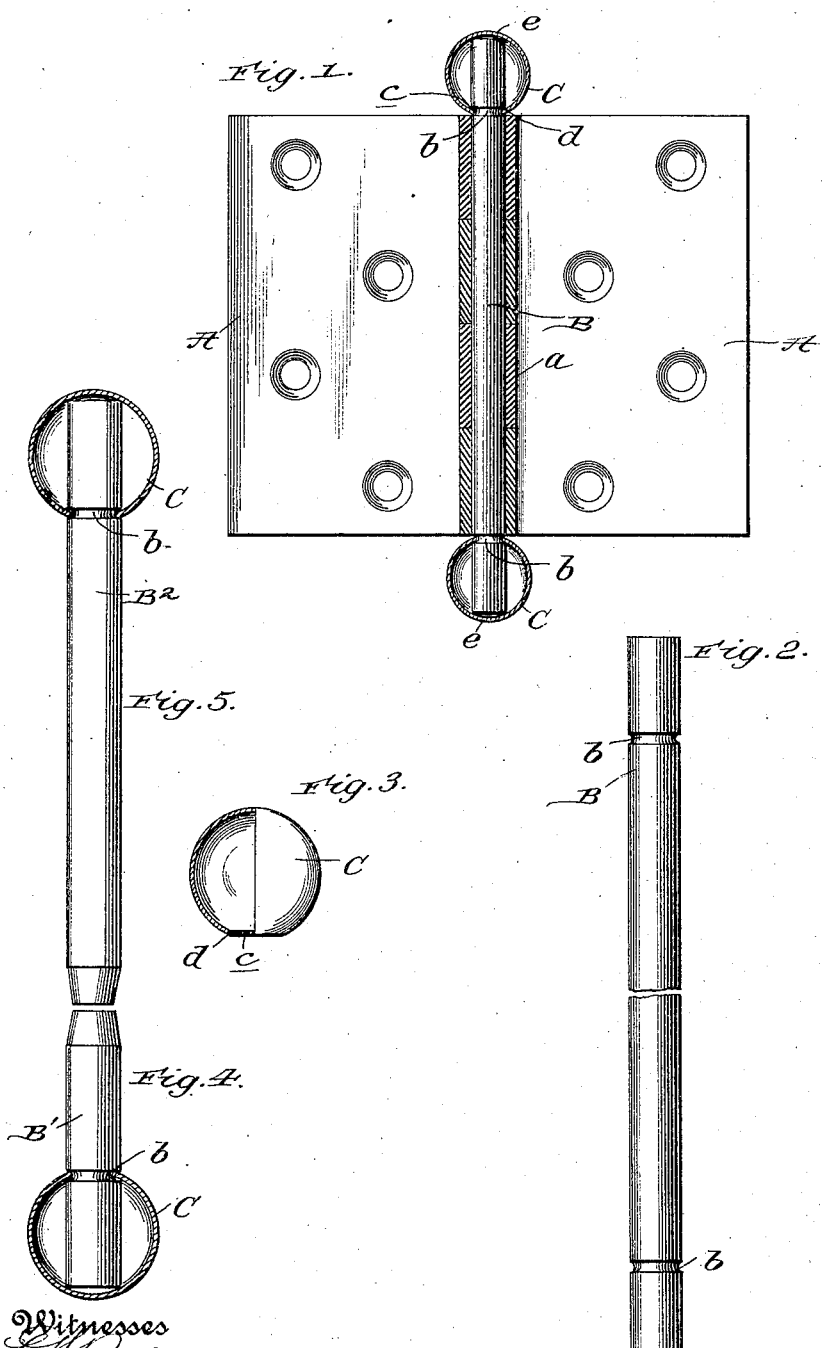

Patented April 18, 1905.

UNITED STATES PATENT OFFICE.

RICHARD W. HUBBARD, OF ASHTABULA, OHIO.

HINGE.

SPECIFICATION forming part of Letters Patent No. 787,514, dated April 18, 1905.

Application filed March 6, 1903. Serial No. 146,508.

*To all whom it may concern:*

Be it known that I, RICHARD W. HUBBARD, a citizen of the United States, residing at Ashtabula, in the county of Ashtabula and State of Ohio, have invented new and useful Improvements in Hinges, of which the following is a specification.

My invention relates to butt-hinges; and it has for its object to provide a butt-hinge pin which is a material simplification of those extant and is susceptible of being very easily and cheaply produced.

With the foregoing in mind the invention will be fully understood from the following description and claim, when taken in connection with the accompanying drawings, in which—

Figure 1 is a view, partly in elevation and partly in section, of a butt-hinge embodying a pin constructed in accordance with my invention; Fig. 2, an enlarged broken elevation of the shank of the pin; Fig. 3, an enlarged view, partly in section and partly in elevation, of one of the tips of the pin; Figs. 4 and 5, views, partly in elevation and partly in section, of modified pins.

Referring by letter to said drawings, and more particularly to Figs. 1 to 3 thereof, A A are butt-hinge members having the usual coincident knuckles $a$ at their inner edges. B is the shank of the hinge-pin, constituting one embodiment of my invention, which shank is preferably formed of wire and provided adjacent to its opposite ends with seats, preferably circumferential grooves $b$, and C C are the tips of the improved pin, which are pressed or otherwise formed of sheet metal, are hollow, and are provided with openings $c$ of a size to receive the shank B. One of the tips C is placed on the shank B and secured thereto by turning or pressing its edge $d$ into one groove $b$ at the time of manufacture, while the other tip is placed on the shank subsequent to the arrangement of the latter in the knuckles of the members A and is secured to the shank in the same manner as the first-mentioned shank—*i. e.*, by turning or pressing its edge $d$ into one groove $b$ of the shank. Both of the tips are of such size that the distance between their openings $c$ and their portions $e$ diametrically opposite to said openings corresponds to the distance between the grooves $b$ and the ends of the shank B, this being advantageous, since when the tips are placed and secured on the shank the ends of the latter bear against and support the tip portions $e$ and lessen the liability of the tips being pressed or knocked out of shape.

In Fig. 4 I have shown a short pin having but one groove $b$ in its shank B' and but one tip C thereon. This short pin is designed to be driven, screwed, or otherwise permanently fastened in a hinge or butt and is also designed to be used in the same hinge as the comparatively long pin shown in Fig. 5, which is loosely inserted in and removable from the hinge to permit of a door being readily taken down when desired. The said long pin, Fig. 5, is like the short pin, Fig. 4, in that it has but one groove $b$ in its shank $B^2$ and but one tip thereon.

The shanks are preferably produced by running a piece of wire through a machine adapted to cut the same into pieces of the desired length and form one or two grooves $b$ in each piece. The tips are preferably formed in die-presses, and they are forced on the end or ends of the shanks and are secured thereto by turning or pressing their edges into the grooves $b$ or against the surfaces of the shanks. When the shanks and tips are connected, the tips are japanned or plated, after which the pins are ready for use.

It will be readily appreciated from the foregoing that hinge-pins embodying my invention may be very easily and cheaply produced, also that they are uniform in quality and finished in appearance.

Having described my invention, what I claim, and desire to secure by Letters Patent, is—

In the hinge described, the combination of members A having coincident knuckles, and a hinge-pin arranged in a knuckle or knuckles and consisting essentially of a shank having a circumferential groove $b$ adjacent to one of its ends; said groove being disposed at one end of the hinge members A, and a hollow, globular tip of sheet metal having an opening $c$ snugly receiving the shank and also having its edge which forms the wall of the opening $c$ turned into the circumferential groove $b$ in the shank, whereby it is held against movement off the shank; the distance between the circumferential groove $b$ and the adjacent end of the shank corresponding to the difference between the said edge of the tip and the opposite portion of the tip, whereby said portion is supported by the shank.

In testimony whereof I have hereunto set my hand in presence of two subscribing witnesses.

RICHARD W. HUBBARD.

Witnesses:
EDWARD P. HALL,
JUSTUS F. MUNSELL.